United States Patent [19]
Bonneau et al.

[11] Patent Number: 5,386,147
[45] Date of Patent: Jan. 31, 1995

[54] AEROSPACE POWER CONTROL SYSTEM FOR MONITORING AND RELIABLY TRANSFERRING POWER BUSES

[75] Inventors: Victor B. Bonneau, Yellow Springs; Gary M. Kuzkin, Oakwood; Robert G. Wagoner, Troy; John A. Overman, Huber Heights, all of Ohio

[73] Assignee: Leland Electrosystems Inc., Vandalia, Ohio

[21] Appl. No.: 184,774

[22] Filed: Jan. 21, 1994

Related U.S. Application Data

[63] Continuation of Ser. No. 678,650, Apr. 1, 1991, abandoned.

[51] Int. Cl.⁶ .............................. H02J 3/06; H02J 9/06
[52] U.S. Cl. .................................. 307/64; 307/87
[58] Field of Search .......................... 307/64–66, 307/85–87, 269, 511, 527; 328/63, 72, 155; 361/85; 322/20

[56] References Cited

U.S. PATENT DOCUMENTS

| | | | |
|---|---|---|---|
| 3,337,742 | 8/1967 | Baehr et al. | 307/68 X |
| 3,390,275 | 6/1968 | Baker | 307/87 X |
| 3,662,182 | 5/1972 | Ullmann et al. | 307/64 |
| 3,999,077 | 12/1976 | Borkovitz et al. | 307/66 |
| 4,384,213 | 5/1983 | Bogel | 307/87 X |
| 4,539,618 | 9/1985 | Stich | 361/94 |
| 4,761,563 | 8/1988 | Ross et al. | 307/87 |
| 4,879,624 | 11/1989 | Jones et al. | 307/87 X |
| 4,905,134 | 2/1990 | Recker et al. | 307/64 X |
| 4,937,462 | 6/1990 | Recker et al. | 307/87 X |
| 5,138,184 | 8/1992 | Keefe | 307/64 |

OTHER PUBLICATIONS

"Power Transfer Unit (PTU) Fact Sheet", Jun. 21, 1989 (Preliminary).
"Electronic Bus Transfer Switch Fact Sheet", IBM Publication, date unknown.
"IBM Electronic Bus Transfer (EBT) Patent and Technology License Summary", IBM Publication, date unknown.
"IBM Electronic Bus Transfer (EBT) Technology, A Revolutionary Inovation In Power Switching" by Roger T. Ellefson, Forrest K. Smith, George K. Woodworth, Jan. 23, 1989.
"Power Management Influences Present and Future Generation Avionic Supplies" by Sam Davis, PCIM, Apr. 1989.
"Market Dimensioning Study Electronic Bus Transfer" prepared by Federal System Manassas, Va., Apr. 30, 1990.
"Electronic Bus Transfer Equipment Performance Specification" Revision, Mar. 17, 1989.

*Primary Examiner*—A. D. Pellinen
*Assistant Examiner*—Fritz M. Fleming
*Attorney, Agent, or Firm*—Killworth, Gottman, Hagan & Schaeff

[57] ABSTRACT

An aerospace power control system switches an aerospace load from a faulty ac power bus to a good ac power bus of two or more ac power buses if the currently connected ac power bus is about to fail. The voltage level and frequency of the power provided on the buses are monitored to determine which of the power buses are within required limits to provide power to the aerospace load. If monitoring of the currently connected ac power bus indicates that the bus is not within the required limits and may be shut down in the immediate future, the connection of the aerospace load is switched to another ac power bus which is within the required limits. The current provided to the load is monitored to determine zero-crossing points of the current with the switch from the currently connected faulty bus to a good bus being performed at a zero-crossing point of the load current. The level of the current being provided to the aerospace load is also monitored to detect a faulty load condition. If the load current exceeds defined limits, the load will be disconnected from all ac power buses to shut down the faulty load. The aerospace power control system is generally applicable to single phase and three phase ac power, with switch over at zero-crossing points being performed on a phase-by-phase basis for three phase ac power.

20 Claims, 4 Drawing Sheets

AEROSPACE POWER CONTROL SYSTEM FOR MONITORING AND RELIABLY TRANSFERRING POWER BUSES

This is a continuation of application Ser. No. 07/678,650, filed Apr. 1, 1991 and now abandoned.

BACKGROUND OF THE INVENTION

The present invention relates generally to aerospace power supplies as used in flying/swimming/crawling systems and, more particularly, to a method and apparatus for monitoring two or more buses providing power to such a system and performing a current zero-crossing switch from a faulty bus to a good bus prior to failure of the faulty bus and with no power interruption for the system. Any failure of power supplied on a bus such that the voltage or frequency of the power is in error by more than a given percentage, for example ±5%, will be referred to as a fault or a faulty bus herein.

Aerospace power supplies are used to power important operational systems in a variety of flying/swimming/crawling applications. For example and perhaps the most critical systems are in aircraft and include the avionics and flight control systems. If the operation of these systems are interrupted by a power failure, the time required to restart the systems can be much more than an inconvenience to the operators.

To ensure continuous operation, aerospace power supplies normally have redundant power buses, typically comprising two or more three phase buses, which are switchably interconnected to the systems which they power. While redundant power buses held to ensure a reliable source of power, in the event of failure of a currently connected bus, the switching operation can itself lead to a power interruption which requires a system powered thereby to be restarted. To overcome such switching problems and to maintain the voltage level and frequency of an ac power supply to a given system, ac-to-ac converters have been used to interface between ac power supplies and the loads which they power.

When ac-to-ac converters are used, the importance of the voltage level and frequency of the primary supply is substantially reduced. Typically, ac-to-ac converters receive ac power from a primary supply, such as a generator, convert the ac power to dc power and then "construct" or generate ac power of the required voltage level and frequency, for example 110 volts and 400 hertz, for in turn powering the aerospace equipment. Thus, as long as sufficient power is available to maintain the dc power at a level capable of being converted into the required ac output power, the voltage level and frequency of the input ac power is not critical. Further, the ac-to-ac converters provide carryover and buffer switches between power buses in the event a primary ac power supply fails. While ac-to-ac converters are thus attractive as providing closely regulated power, both from a voltage level and frequency standpoint, such converters are expensive and tend to be relatively heavy.

Currently available regulators make possible the generation of ac power which can be maintained within tolerable limits for voltage level and frequency. However, maintaining continuous power for an aerospace load while switching from one bus to another still creates problems. If the switch is to performed as a "make-before-break" switch, the two buses are connected together and accordingly must be synchronized with one another or be capable of withstanding substantial transient power levels of not synchronized. On the other hand, if the switch is to be performed as a "break-before-make" switch, while synchronization is not required, provision must be made for carryover of the power provided to the load and the power supplies must again be able to withstand substantial transient power levels. Once again, appropriate systems are both expensive and tend to be heavy.

It is thus apparent that a need exists for an improved arrangement for switching between or among two or more power buses to provide substantially continuous power to critical aerospace loads without having to synchronize the power buses and without generating substantial transients which can damage the power buses and potentially interfere with the operation of the aerospace loads.

SUMMARY OF THE INVENTION

This need is met by the improved method and apparatus of the present invention wherein an aerospace load is provided with ac power by selective connection to one of two or more ac power buses. The voltage level and frequency of the power provided on the buses are monitored to determine which of the power buses are within required limits to provide power to an aerospace load. If monitoring of the currently connected ac power bus indicates that the bus is not within the required limits and may be shut down in the immediate future, the connection of the aerospace load is switched to another ac power bus which is within the required limits. The current provided to the load is monitored to determine zero-crossing points of the current with the switch from the currently connected faulty bus to an acceptable bus being performed at a zero-crossing point of the load current. The level of the current being provided to the aerospace load is also monitored to detect a faulty load condition. If the load current level exceeds defined limits, the load will be disconnected from all ac power buses to shut down the faulty load. The present invention is generally applicable to single phase and three phase ac power, with switch over at zero-crossing points being performed on a phase-by-phase basis for three phase ac power.

In accordance with one aspect of the present invention, an aerospace power control system for switching a load from a first ac power bus to a second ac power bus in the event of a fault comprises switch means connected to the first and second ac power buses and to the load for selectively connecting the load to one of the first and second ac power buses. First monitoring means is connected to the first and second ac power buses for monitoring the voltage level of ac power on the first and second ac power buses. Second monitoring means is connected to the first and second ac power buses for monitoring the frequency of ac power on the first and second ac power buses. Detector means is coupled to the switch means for identifying zero-crossing points of ac current drawn by the load. Switch control means is connected to the first monitoring means, the second monitoring means and the detector means for controlling the switch means to switch the connection of the load from the first ac power bus to the second ac power bus at a zero-crossing point of ac current drawn by the load in the event of a fault in the voltage level or frequency of ac power provided by the first ac power bus.

In accordance with another aspect of the present invention, an aerospace power control system for controlling the connection of a load to a properly operating one of at least a first ac power bus and a second ac power bus in the event of a fault comprises switch means connected to the at least first and second ac power buses and to the load for connecting the load to none or one of the first and second ac power buses. First monitoring means is connected to the at least first and second ac power buses for monitoring the voltage level of ac power on the at least first and second ac power buses. Second monitoring means is connected to the at least first and second ac power buses for monitoring the frequency of ac power on the at least first and second ac power buses. Detector means is coupled to the switch means for identifying zero-crossing points and the level of ac current drawn by the load. Switch control means is connected to the first monitoring means, the second monitoring means and the detector means for controlling the switch means to switch the connection of the load from a currently connected one of the at least first and second ac power buses to another of the at least first and second ac power buses at a zero-crossing point of ac current drawn by the load. Bus switching is performed in the event of a fault in the voltage level or frequency of ac power provided by the currently connected one of the first and second ac power buses and if no fault exists in the voltage level or frequency of the another one of the first and second ac power buses.

In accordance with still another aspect of the present invention, an aerospace power control system for switching a load from a first ac power bus to a second ac power bus in the event of a fault comprises switch means connected to the first and second ac power buses and to the load for selectively connecting the load to one of the first and second ac power buses. First monitoring means is connected to the first and second ac power buses for monitoring the voltage level of ac power on the first and second ac power buses. Detector means is coupled to the switch means for identifying zero-crossing points of ac current drawn by the load. Switch control means is connected to the first monitoring means and the detector means for controlling the switch means to switch the connection of the load from the first ac power bus to the second ac power bus at a zero-crossing point of ac current drawn by the load in the event of a fault in the voltage level of ac power provided by the first ac power bus. The aerospace power control system may further comprise second monitoring means connected to the first and second ac power buses for monitoring the frequency of ac power on the first and second ac power buses. The switch control means is then also connected to the second monitoring means and further provides for controlling the switch means to switch the connection of the load from the first ac power bus to the second ac power bus at a zero-crossing point of ac current drawn by the load in the event of a fault in the frequency of ac power provided by the first ac power bus.

The switch control means disconnects the load from the connected one of the at least first and second ac power buses if the level of current drawn by the load exceeds a defined level. The disconnection of a faulty load prevents the propagation of a load fault into the ac buses. Preferably, the switch means comprises a first pair of antiparallel connected solid-state switches connected between the first ac power bus and the load, and a second pair of antiparallel connected solid-state switches connected between the second ac power bus and the load. To ensure that the ac buses can be disconnected from the load in the event of failure of the solid-state switches, the switch means preferably further comprises a first electromechanical contactor connected in series with the first pair of antiparallel connected solid-state switches between the first ac power bus and the load, and a second electromechanical contactor connected in series with the second pair of antiparallel connected solid-state switches between the second ac power bus and the load. While the aerospace power control system of the present invention may be hardware embodied, for maximum versatility the switch control means comprises a microprocessor.

In accordance with yet another aspect of the present invention, a method of controlling the connection of an aerospace load to one of at least a first ac power bus and a second ac power bus in response to fault conditions of the load and the at least first and second ac power buses comprises the steps of: monitoring the voltage level of ac power on the at least first and second ac power buses; monitoring the frequency of ac power on the at least first and second ac power buses; detecting zero-crossing points of ac current drawn by the load; and, switching the connection of the load from a currently connected one of the at least first and second ac power buses to another one of the at least first and second ac power buses at a zero-crossing point of ac current drawn by the load in the event of a fault in the voltage level or frequency of ac power provided by the currently connected one of the at least first and second ac power buses.

The method may further comprise the steps of: detecting current level of the ac current drawn by the load; and, disconnecting the load from the at least first and second ac power buses if the level of current drawn by the load exceeds a defined level. To help ensure continuous power to the load, the step of monitoring the voltage level of ac power on the first and second ac power buses is performed to detect an imminent failure of the currently connected one of the ac power buses. In this way, the step of switching the connection of the load from the currently connected bus in the event of a fault in its voltage level can be performed prior to its failure. Similarly, monitoring the frequency of ac power on the first and second ac power buses is performed to detect an imminent failure of the currently connected one of the buses due to frequency errors such that the step of switching the connection of the load from the currently connected one of the buses in the event of a fault in the frequency of ac power provided thereby is performed prior to failure of the currently connected bus.

It is thus an object of the present invention to provide an improved method and apparatus for switching between or among two or more power buses to provide substantially continuous power to critical aerospace loads; to provide an improved method and apparatus for switching between or among two or more power buses to provide substantially continuous power to critical aerospace loads by means of pairs of antiparallel connected solid-state switches connected between the load and the ac buses; and, to provide an improved method and apparatus for switching between or among two or more power buses to provide substantially continuous power to critical aerospace loads by monitoring the voltage and frequency of ac power on the buses such that the load can be switched from a failing bus before the bus actually fails.

Other objects and advantages of the invention will be apparent from the following description, the accompanying drawings and the appended claims.

DETAILED DESCRIPTION OF THE INVENTION

Figure 1:
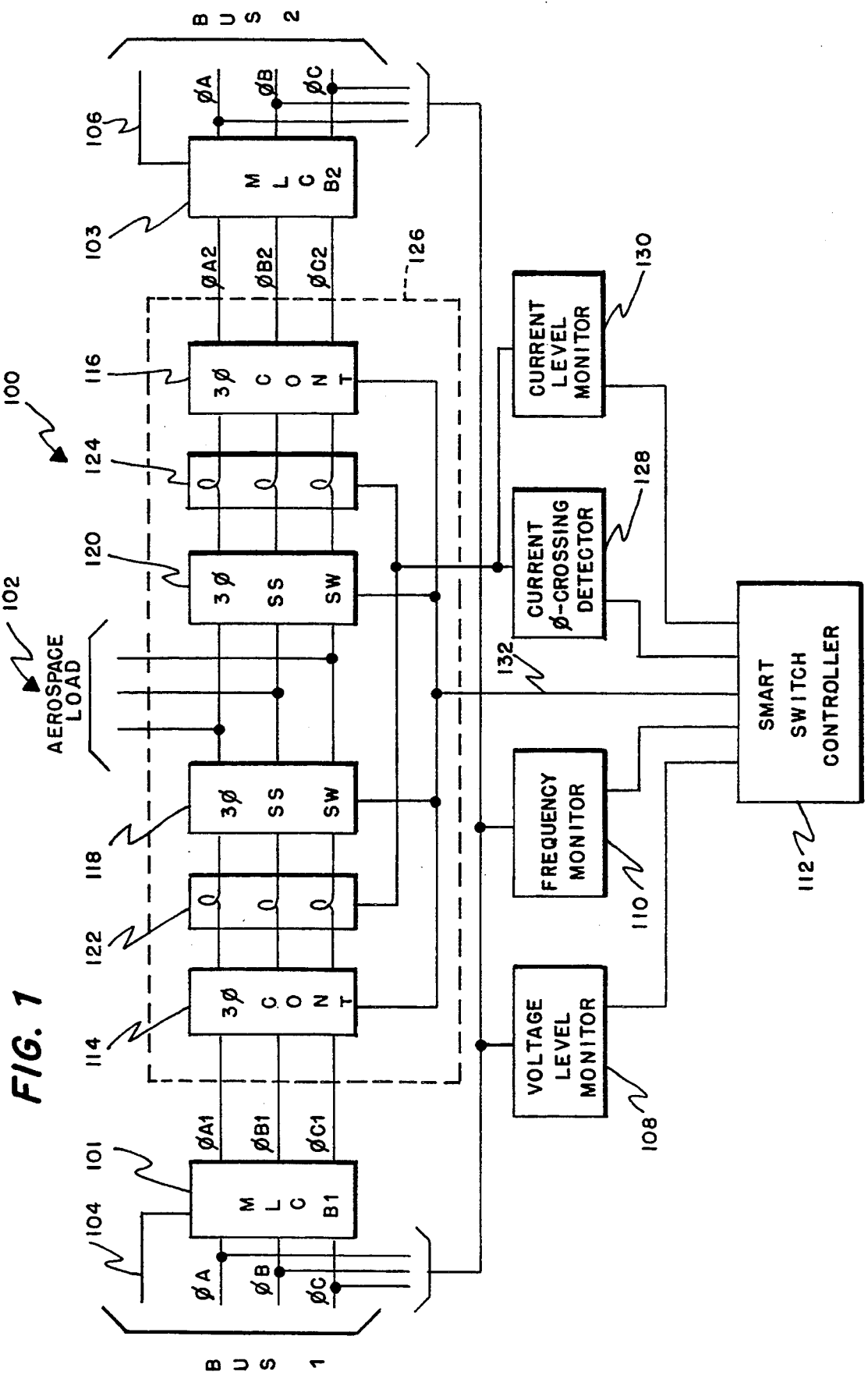
FIG. 1 is a schematic block diagram of an aerospace power distribution system including a system monitor and reliable transfer (SMART) switch in accordance with the present invention.

The invention will now be described with reference to the drawing figures wherein FIG. 1 is a schematic block diagram of an aerospace power distribution system 100 including the SMART switch of the present invention. A three phase aerospace load 102, such as the avionics or flight control systems of an aircraft, is to be connected to one or the other of three phase ac power buses BUS1 or BUS2 to reliably power the load 102. If the load 102 is itself faulty, it is to be shut down by disconnection from both ac power buses BUS1 and BUS2. While only two ac power buses BUS1 and BUS2 are illustrated in FIG. 1, it is to be understood that the load 102 could be connected to any one of two or more buses in accordance with the present invention.

The three phase power buses BUS1 and BUS2 are typically the output of separate and independent generators (not shown) and each include a main line contactor MLC B1 101, MLC B2 103 which is controlled by monitor and control circuitry associated with its corresponding generator or other power source. Input power for the buses is provided on $\phi$A, $\phi$B and $\phi$C power leads and the main line contactors are controlled via control conductors 104 and 106. The main line contactors MLC B1 101 and MCL B2 103 are opened if designated voltage and/or frequency limits of the power on the ac power buses BUS1 and BUS2 are not met.

The generation of the power on the ac power buses BUS1 and BUS2 is not important to the invention of the present application. However, the monitor and control parameters used to operate and release the main line contactors MLC B1 101 and MCL B2 103 are preferably coordinated with the operation of the SMART switch to ensure bus transfer prior to shut down of a bus due to operation of the main line contactors MLC B1 101 and/or MCL B2 103. By including the monitor and control parameters used to control the main line contactors in the SMART switch, the SMART switch can detect when a bus failure is imminent and, since bus transfer via the SMART switch is substantially faster than release of a main line contactor, bus transfer prior to bus shut down is assured.

As shown in FIG. 1, the power leads $\phi$A, $\phi$B and $\phi$C are connected to a voltage level monitor 108 and a frequency monitor 110 which are in turn connected to a SMART switch controller 112. Thus, the SMART switch controller 112 is continually advised of the voltage level of the power on the three phases of the power buses BUS1 and BUS2 and also the frequency of that power. For example, the power on the power buses BUS1 and BUS2 would typically be maintained to within ±5% of nominal values for both voltage and frequency. If the nominal values are exceeded on the bus currently connected to the load 102, a bus switching operation is performed at zero-crossing of the load current to maintain proper operation of the aerospace load 102 in accordance with the present invention as will be described. By coordinating the acceptable limits of power used by the SMART switch with the limits used to control the main line contactors MLC B1 101 and MLC B2 103, the bus switch can be performed before the corresponding main line contactor is opened. This preswitch is ensured due to the substantially higher operating speed of the SMART switch vis-a-vis the main line contactors. While both voltage level and frequency monitoring is performed in the illustrated embodiment, it is noted that either one or the other can be monitored in accordance with the present invention with voltage level monitoring being preferred if only one is monitored.

The power buses BUS1 and BUS2 are connected to the aerospace load 102 through switch means comprising series connections of three phase electromechanical contactors 114, 116 and three phase solid-state switches 118, 120 in the illustrated embodiment. Two sets of current transformers 122, 124 are connected between the three phase electromechanical contactors 114, 116 and the three phase solid-state switches 118, 120 for monitoring current flowing to the load 102. This connecting arrangement is contained within a dotted-line box 126 in FIG. 1. The current transformers 122, 124 are connected to a current zero-crossing detector 128 and a current level monitor 130 which are in turn connected to the SMART switch controller 112. Thus, the SMART switch controller 112 is continually advised of the zero-crossing points of the current flowing to the load 102 and also of the level of that current. Finally, the SMART switch controller 112 is connected to control the three phase electromechanical contactors 114, 116 and the three phase solid-state switches 118, 120 via control conductors 132.

Figure 2:
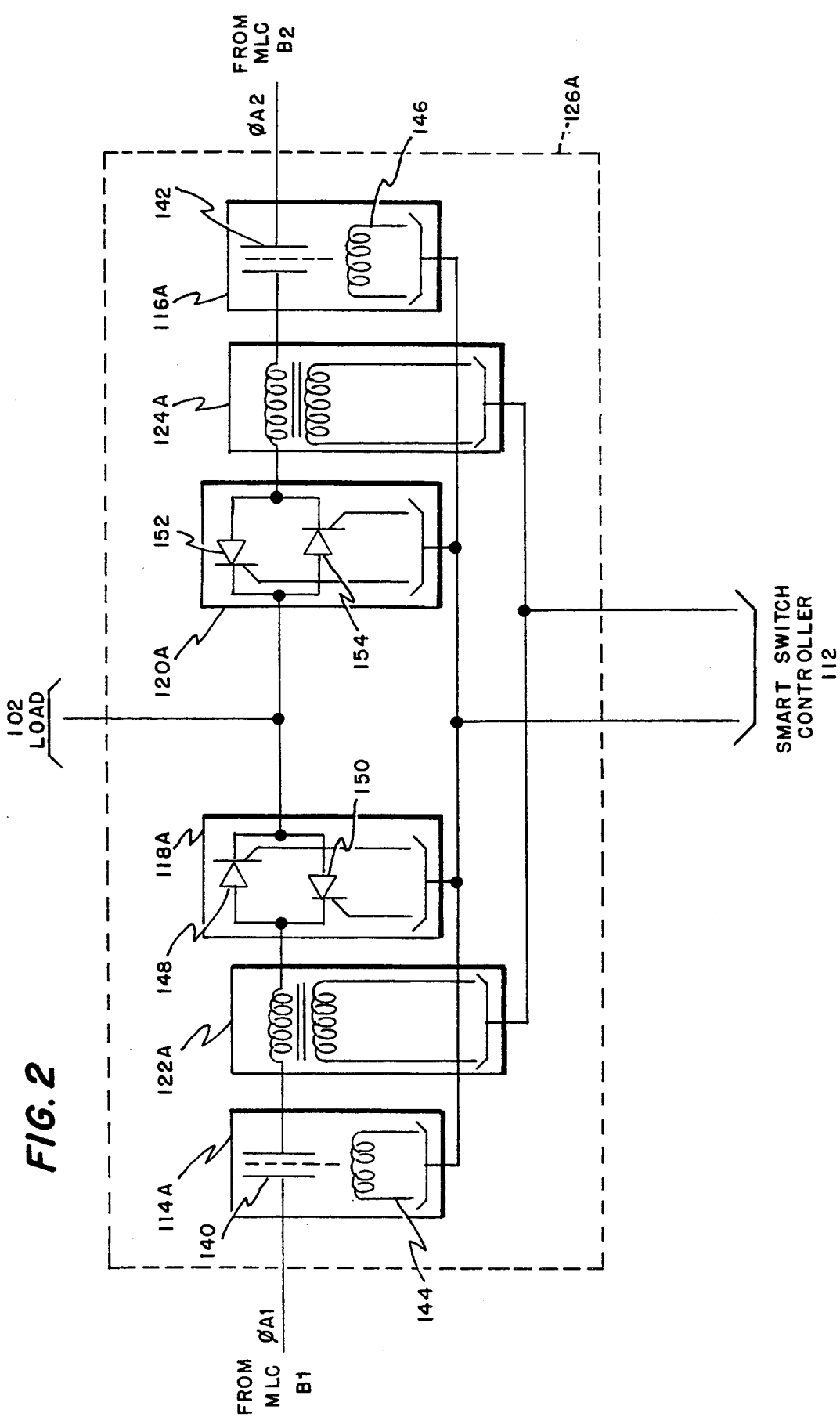
FIG. 2 is a schematic block diagram of a single phase of switch means of FIG. 1 for connecting a load to either first or second power buses.

One phase 126A of the power bus connecting arrangement 126 of FIG. 1 is shown in FIG. 2 in schematic block diagram form. Phase A, $\phi$A, of the connecting arrangement 126 is shown in FIG. 2 as being representative of each of the power phase connections and makes up electromechanical contactors 114A, 116A and solid-state switches 118A, 120A with current transformers 122A, 124A being connected in series therebetween. As shown in FIG. 2, the electromagnetic contactors 114A, 116A of the switch means comprise contacts 140, 142 and operating coils 144, 146 for each phase of power.

The solid-state switch 118A of the switch means comprises a first pair of antiparallel connected solid-state switches 148, 150, illustrated as silicon controlled rectifiers (SCR's), and the solid-state switch 120A of the switch means comprises a second pair of antiparallel connected solid-state switches 152, 154, illustrated as SCR's. Of course other solid-state power switching devices could be used in the present invention such as field effect transistors (FET's), insulated gate bipolar transistors (IGBT's), bipolar junction transistors (BJT's), or the like.

The first and second electromechanical contactors 114, 116 are connected in series with the solid-state switches 118, 120 to ensure that the ac buses BUS1 and BUS2 can be disconnected from the load 102 in the event of failure of the solid-state switches 118, 120. When the system including the present invention is activated or powered up, the electromechanical contactors 114, 118 are operated and remain operated unless a fault condition occurs in the solid-state switches 118, 120.

Operation of the aerospace power distribution system 100 including the present invention will now be described with reference to FIGS. 3–5. Operation of the system 100 is typically started by operation of a power switch (not shown) from off to on represented by the start point 200. While it may be preferred to check the condition of the ac power buses BUS1 and BUS2 prior to closing the electromechanical contactors 114, 116 and connecting the load 102, these steps can be performed initially as shown in blocks 202, 204 since checking of the power buses is then immediately performed.

In any event, the voltage level on both 3$\phi$ ac power buses BUS1 and BUS2 is checked to determine whether voltages on all phases of the buses are within defined acceptable limits, typically ±5%, see block 206. If the voltages of all phases on the buses are within limits, the frequency of the power available on all phases of the buses is next checked to determine whether the frequency of the available power is within defined acceptable limits, typically ±5%, see block 208. If the frequency of the power available on the buses is within limits, the load current is checked to see whether the current being drawn by the load 102 is within defined acceptable limits, see block 210. If the voltage level, frequency and current level of power being provided to the load 102 is acceptable, the monitoring steps described are repeated.

If the voltage level on one of the buses is determined to be outside of acceptable limits, the voltage level of the bus currently connected to the load 102 is checked, see block 212. If the voltage level of the bus currently connected to the load 102 is within defined limits, the bus which is not connected is indicated as being bad, see block 214, and the monitoring operations are continued. If the voltage level of the bus currently connected to the load 102 is not within defined limits, the voltage level of the bus which is not connected to the load 102 is checked, see block 216. If the voltage level of the bus currently not connected to the load 102 is within limits, the connection of the load is transferred from the currently connected bus to the bus which is not currently connected, the bus which is disconnected is indicated as being bad and the monitoring operations continue, see blocks 218, 214. The bus transfer is performed at zero-crossing of the current being supplied to the load 102 to minimize noise transients and to provide substantially continuous power to the load 102.

In the illustrated embodiment, as soon as a bus transfer is requested, for example for a voltage fault as just described, bus switching is performed via the solid-state switches 118, 120 at the very next zero-crossing points of each of the three-phase current waveforms. Two examples of bus switching in response to a fault F are illustrated in FIGS. 4 and 5. In FIG. 4, the switching is performed with the voltage of the two buses BUS1 and BUS2 being relatively close to one another in phase. As can be seen, the resulting discontinuity of the voltage waveform provided to the load 102 is relatively minor and presents only a minor glitch in the power to the load 102.

Figure 5:
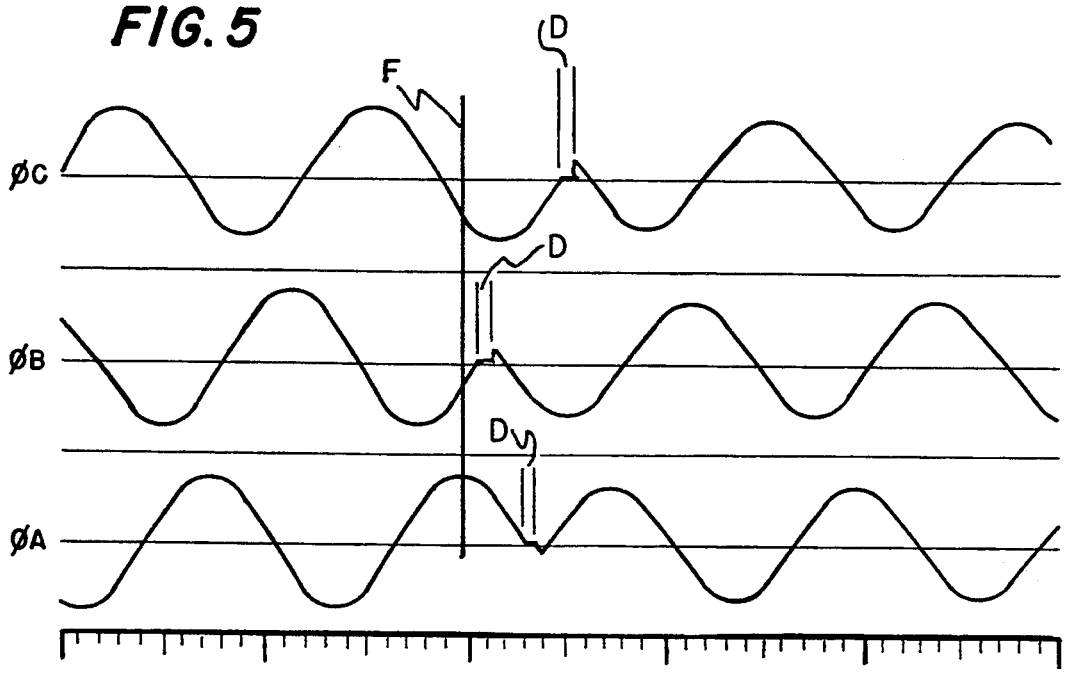

In FIG. 5, the phase relationship between the voltage on BUS1 and BUS2 is substantially different, in fact almost 180° out of phase from one another. While a substantially greater glitch is generated in the power provided to the load 102, it is apparent that no substantial transients are generated and once again power to the load is maintained substantially constant. The ability to perform smooth bus transfers is due to the zero-crossing switches performed in the SMART switch of the present invention.

Figure 4:
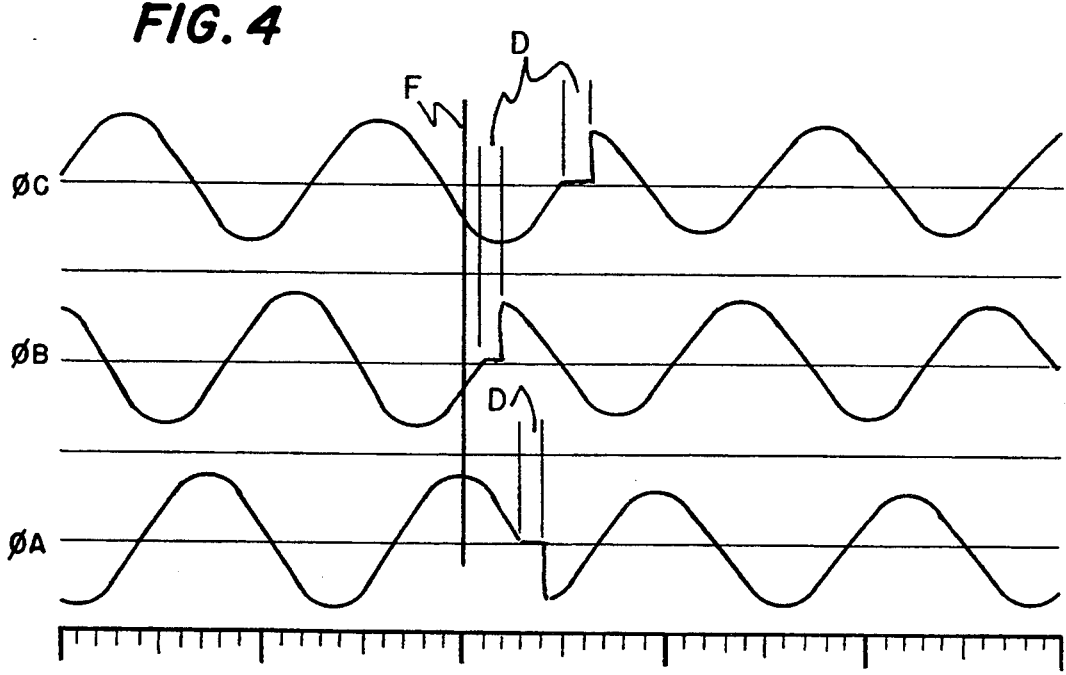
FIGS. 4 and 5 are graphical representations of bus transfers illustrating discontinuities in the power provided to a load for two different phase variations of two buses at the time of transfer.

As can also be noted in FIGS. 4 and 5, there is a small delay, D, in switching between the buses BUS1 and BUS2. This delay is introduced intentionally to ensure that the solid-state switch which is being disconnected at zero-crossing has been disconnected prior to connection of the solid-state switch which is being connected. The zero-crossing transfer or switch is performed in the illustrated embodiment of the present invention by removing gate power from the SCR's which make up the solid-state switch which is to perform the disconnection of the currently connected bus prior to zero-crossing of the current waveform such that the SCR's will become nonconducting at the zero-crossing point of the current waveform. Gate drive is then provided to the SCR's which make up the solid-state switch which is to perform the connection of the newly connected bus substantially at the zero-crossing point of the current waveform.

As noted, to ensure that the first solid-state switch is disconnected before the other solid-state switch is connected such that there is no cross connection of the buses, a slight delay is introduced between the actual zero-crossing and the provision of gate power to the newly connected switch. Investigations to date indicate that the delay will be less than 50 microseconds; however, no optimum delay time has been determined to date. It is contemplated that such optimum delay time will be dependent on the selection of switching devices and also control circuitry, and hence will probably vary from design to design.

Returning to FIG. 3, if the voltage level of the bus which is not currently connected is also not within limits, the aerospace power distribution system 100 is shut down and the system control sequence is ended, see block 220 and end point 222. If the frequency of the power on one of the buses BUS1 or BUS2 is not within limits, the frequency of the power on the currently connected bus is checked, see block 224.

If the frequency of the power on the currently connected bus is within limits, the bus not currently connected is indicated as being bad and monitoring continues. If the frequency of the power on the currently connected bus is not within limits, the frequency of the power on the bus not currently connected is checked, see block 226. If the frequency of the power on the bus not currently connected is within limits, the buses are transferred at the next zero-crossing point of the current waveform as previously described, the currently connected bus is indicated as being bad and monitoring continues, see blocks 228 and 214. If the frequency of the power on the bus not currently connected to the load 102 is also not within limits, the aerospace power distribution system 100 is shut down and the system control sequence is ended, see block 220 and end point 222.

Figure 3:
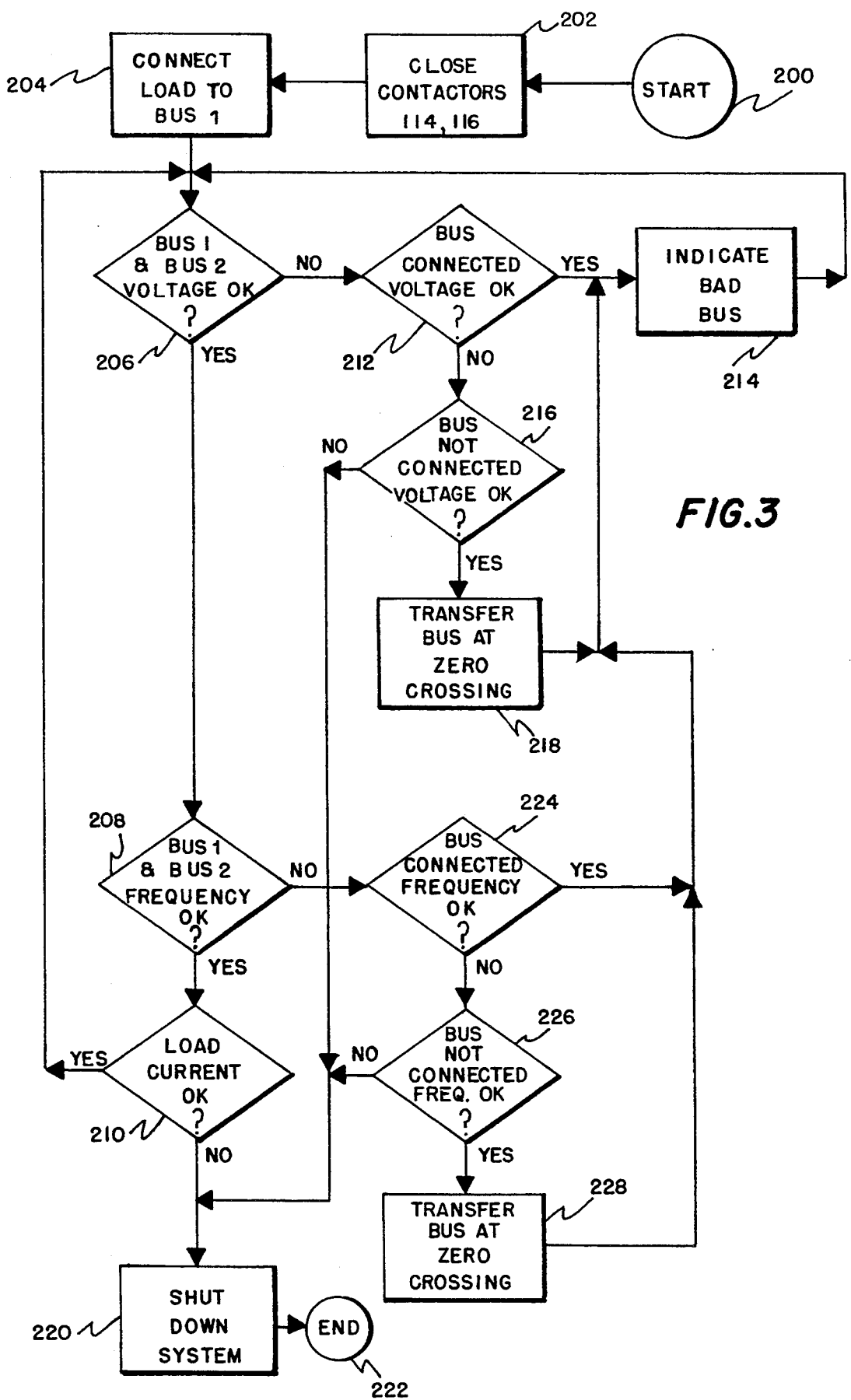
FIG. 3 is a flow chart showing operation of the aerospace power distribution system of FIG. 1.

FIG. 3 illustrates the operations which are performed by the SMART switch of the present invention and are described in terms of the monitoring and control functions being performed by the SMART switch controller 112 or, more accurately, by a microprocessor substantially making up the SMART switch controller 112. To enhance operation of the SMART switch controller 112, preferably the signals provided to the SMART switch controller 112 take the form of interrupt signals. Thus, it is preferred to have the voltage level monitor 108, the frequency monitor 110, the current zero-crossing detector 128 and the current level monitor 130 operate substantially independently of the SMART switch controller 112 and provide input in the form of both data representative of the monitored power or current parameter and also in the form of an interrupt signal to the microprocessor making up the SMART switch controller 112.

In this way, the microprocessor can rapidly monitor interrupt inputs and service any interrupt inputs almost immediately rather than taking the time to scan and evaluate the input data in a continuously circulating routine. Priorities can also be set on the interrupts such that the SMART switch controller 112 can substantially immediately respond to the highest priority fault condition which is indicated. Currently applied priorities from highest to lowest are: (1) voltage level of power on the buses; (2) frequency of power on the buses; and, (3) level of the current being provided to the load 102. A microprocessor designated as an MC68HC11AOP/BXAJC which is commercially available from Motorola is contemplated for use in the present invention.

Having thus described the aerospace bus power control monitoring and transferring method and apparatus of the present invention in detail and by reference to preferred embodiments thereof, it will be apparent that modifications and variations are possible without departing from the scope of the invention defined in the appended claims.

What is claimed is:

1. An aerospace power control system for switching a load from a first ac power bus having at least two phases to a second ac power bus having a like number of phases in the event of a fault within said first ac power bus, said switching be performed with substantially no power interruption, said control system comprising:
   switch means connected to said first and second ac power buses and to said load for selectively connecting said load to one of said first and second ac power buses;
   first monitoring means connected to said first and second ac power buses for monitoring the voltage level of ac power on all phases of said first and second ac power buses;
   second monitoring means connected to said first and second ac power buses for monitoring the frequency of ac power on all phases of said first and second ac power buses;
   detector means coupled to said switch means for identifying zero-crossing points of all phases of ac current flowing through said switch means; and
   switch control means connected to said first monitoring means, said second monitoring means and said detector means for controlling said switch means to perform a break-before-make switch of the connection of said load from said first ac power bus to said second ac power bus at first zero-crossing points of each phase of ac current flowing through said switch means after detection of a fault in the voltage level or frequency of ac power provided by said first ac power bus by said first or second monitoring means.

2. An aerospace power control system as claimed in claim 1 wherein said switch means comprises a pair of antiparallel connected solid-state switches connected between each phase of said first ac power bus and said load, and a pair of antiparallel connected solid-state switches connected between each phase of said second ac power bus and said load.

3. An aerospace power control system as claimed in claim 2 wherein said switch means further comprises an electromechanical contactor connected in series with each pair of antiparallel connected solid-state switches connected between said first ac power bus and said load, and an electromechanical contactor connected in series with each pair of antiparallel connected solid-state switches connected between said second ac power bus and said load.

4. An aerospace power control system as claimed in claim 1 wherein said switch control means comprises a microprocessor.

5. An aerospace power control system for controlling the connection of a load to a properly operating one of at least a first ac power bus having at least two phases and a second ac power bus having a like number of phases in the event of a fault within the currently connected one of said at least first and second ac power buses, said connection control be performed with substantially no power interruption, said control system comprising:
   switch means connected to said at least first and second ac power buses and to said load for connecting said load to none or one of said first and second ac power buses;
   first monitoring means connected to said at least first and second ac power buses for monitoring the voltage level of ac power on said at least first and second ac power buses;
   second monitoring means connected to said at least first and second ac power buses for monitoring the frequency of ac power on said at least first and second ac power buses;
   detector means coupled to said switch means for identifying zero-crossing points of each phase of ac current flowing through said switch means and the level of each phase of ac current flowing through said switch means; and
   switch control means connected to said first monitoring means, said second monitoring means and said detector means for controlling said switch means to perform a break-before-make switch of the connection of said load from a currently connected one of said at least first and second ac power buses to another of said at least first and second ac power buses at a first zero-crossing point of each phase of ac current flowing through said switch means after detection of a fault in the voltage level or frequency of ac power provided by the currently connected one of said first and second ac power buses and no fault in the voltage level or frequency of said another one of said first and second ac power buses.

6. An aerospace power control system as claimed in claim 5 wherein said switch control means disconnects said load from the connected one of said at least first and second ac power buses if the level of current flowing through said switch means exceeds a defined level.

7. An aerospace power control system as claimed in claim 6 wherein said switch means comprises a pair of antiparallel connected solid-state switches connected between each phase of said first ac power bus and said load, and a pair of antiparallel connected solid-state switches connected between each phase of said second ac power bus and said load.

8. An aerospace power control system as claimed in claim 7 wherein said switch means further comprises an electromechanical contactor connected in series with each pair of antiparallel connected solid-state switches connected between said first ac power bus and said load, and an electromechanical contactor connected in series with each pair of antiparallel connected solid-state switches connected between said second ac power bus and said load.

9. An aerospace power control system as claimed in claim 5 wherein said switch control means comprises a microprocessor.

10. An aerospace power control system for switching a load from a first ac power bus having at least two phases to a second ac power bus having a like number of phases in the event of a fault within said first ac power bus, said switching to be performed with substantially no power interruption, said control system comprising:
   switch means connected to said first and second ac power buses and to said load for selectively connecting said load to one of said first and second ac power buses;
   first monitoring means connected to said first and second ac power buses for monitoring the voltage level of ac power on all phases of said first and second ac power buses;
   detector means coupled to said switch means for identifying zero-crossing points of all phases of ac current flowing through said switch means; and
   switch control means connected to said first monitoring means and said detector means for controlling said switch means to perform a break-before-make switch of the connection of said load from said first ac power bus to said second ac power bus at first zero-crossing point of each phase of ac current flowing through said switch means after detection of a fault in the voltage level of ac power provided by said first ac power bus.

11. An aerospace power control system as claimed in claim 10 further comprising second monitoring means connected to all phases of said first and second ac power buses for monitoring the frequency of all phases of ac power on said first and second ac power buses, said switch control means being connected to said second monitoring means and further providing for controlling said switch means to perform a break-before-make switch of the connection of said load from said first ac power bus to said second ac power bus at first zero-crossing points of each phase of ac current flowing through said switch means after detection of a fault in the frequency of ac power provided by said first ac power bus.

12. An aerospace power control system as claimed in claim 10 wherein said switch means comprises a pair of antiparallel connected solid-state switches connected between each phase of said first ac power bus and said load, and a pair of antiparallel connected solid-state switches connected between each phase of said second ac power bus and said load.

13. An aerospace power control system as claimed in claim 12 wherein said switch means further comprises an electromechanical contactor connected in series with each pair of antiparallel connected solid-state switches connected between each phase of said first ac power bus and said load, and an electromechanical contactor connected in series with each pair of antiparallel connected solid-state switches connected between each phase of said second ac power bus and said load.

14. An aerospace power control system as claimed in claim 10 wherein said switch control means comprises a microprocessor.

15. A method of controlling the connection of an aerospace load to one of at least a first ac power bus having at least two phases and a second ac power bus having a like number of phases in response to fault conditions of said load and said at least first and second ac power buses with substantially no power interruption, said method comprising the steps of:
   monitoring the voltage level of all phases of ac power on said at least first and second ac power buses;
   monitoring the frequency of all phases of ac power on said at least first and second ac power buses;
   detecting zero-crossing points of all phases of ac current drawn by said load; and
   breaking the connection of said load from a currently connected one of said at least first and second ac power buses before making a connection to another one of said at least first and second ac power buses at a first zero-crossing point of each phase of ac current drawn by said load after detection of a fault in the voltage level or frequency of ac power provided by said currently connected one of said at least first and second ac power buses.

16. A method of controlling the connection of an aerospace load as claimed in claim 15 further comprising the steps of:
   detecting current level of each phase of the ac current drawn by said load; and
   disconnecting said load from said at least first and second ac power buses if the level of current drawn by any phase of said load exceeds a defined level.

17. A method of controlling the connection of an aerospace load as claimed in claim 15 wherein the step of breaking the connection of said load from a currently connected one of said at least first and second ac power buses before making a connection to another one of said at least first and second ac power buses comprises the step of controlling switch means comprising pairs of antiparallel connected solid-state switches connected between each phase of said first ac power bus and said load, and pairs of antiparallel connected solid-state switches connected between each phase of said second ac power bus and said load.

18. A method of controlling the connection of an aerospace load as claimed in claim 17 wherein the step of breaking the connection of said load from a currently connected one of said at least first and second ac power buses before making a connection to another one of said at least first and second ac power buses further comprises the step of controlling an electromechanical contactor connected in series with each of said pairs of antiparallel connected solid-state switches connected between said first ac power bus and said load, and an electromechanical contactor connected in series with each of said pairs of antiparallel connected solid-state switches connected between said second ac power bus and said load.

19. A method of controlling the connection of an aerospace load as claimed in claim 15 wherein the step of monitoring the voltage level of all phases of ac power on said first and second ac power buses is performed to detect an imminent failure of the currently connected one of said at least first and second ac power buses such that the step of breaking the connection of said load from a currently connected one of said at least first and second ac power buses at a first zero-crossing of each phase of ac current drawn by said load after detection of a fault in the voltage level of ac power provided by said currently connected one of at least first and second ac power buses is performed prior to failure of the currently connected bus.

20. A method of controlling the connection of an aerospace load as claimed in claim 15 wherein the step of monitoring the frequency of all phases of ac power on said first and second ac power buses is performed to detect an imminent failure of the currently connected one of said at least first and second ac power buses such that the step of breaking the connection of said load from a currently connected one of said at least first and second ac power buses at a first zero-crossing of each phase of ac current drawn by said load after detection of a fault in the frequency of ac power provided by said currently connected one of at least first and second ac power buses is performed prior to failure of the currently connected bus.

* * * * *

UNITED STATES PATENT AND TRADEMARK OFFICE
CERTIFICATE OF CORRECTION

PATENT NO. : 5,386,147
DATED : January 31, 1995
INVENTOR(S) : Victor B. Bonneau, Gary M. Kuzkin, Robert G. Wagoner, John A. Overman It is certified that error appears in the above-indentified patent and that said Letters Patent is hereby corrected as shown below:

Claim 10, column 11, line 44, "point" should be --points--.

Signed and Sealed this

Nineteenth Day of December, 1995

Attest:

BRUCE LEHMAN

Attesting Officer     Commissioner of Patents and Trademarks